(12) United States Patent
Baek et al.

(10) Patent No.: US 11,087,308 B2
(45) Date of Patent: Aug. 10, 2021

(54) USER TERMINAL DEVICE, TERMINAL FOR PAYMENT, AND METHOD AND SYSTEM FOR PAYMENT USING THE USER TERMINAL DEVICE AND TERMINAL FOR PAYMENT

(71) Applicant: SAMSUNG ELECTRONICS CO., LTD., Suwon-si (KR)

(72) Inventors: Sung-Wook Baek, Seoul (KR); Young-ah Seong, Seoul (KR); Pil-seung Yang, Suwon-si (KR); Say Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 15/575,922

(22) PCT Filed: May 27, 2016

(86) PCT No.: PCT/KR2016/005662
§ 371 (c)(1),
(2) Date: Nov. 21, 2017

(87) PCT Pub. No.: WO2016/190716
PCT Pub. Date: Dec. 1, 2016

(65) Prior Publication Data
US 2018/0150824 A1    May 31, 2018

Related U.S. Application Data

(60) Provisional application No. 62/166,914, filed on May 27, 2015.

(30) Foreign Application Priority Data

May 27, 2016 (KR) .................. 10-2016-0065805

(51) Int. Cl.
*G06Q 20/32* (2012.01)
*G06Q 20/22* (2012.01)
(Continued)

(52) U.S. Cl.
CPC .......... *G06Q 20/3224* (2013.01); *G01S 11/00* (2013.01); *G06Q 20/102* (2013.01);
(Continued)

(58) Field of Classification Search
CPC .. G06Q 20/3224; G06Q 20/102; G06Q 20/22; G06Q 20/32; G06Q 20/322;
(Continued)

(56) References Cited

U.S. PATENT DOCUMENTS 8,781,622 B2 *  7/2014  Mockus ................. G05B 15/02
                                                          700/237
8,805,725 B2 *  8/2014  Calman ................ G06Q 20/405
                                                          705/16

(Continued)

FOREIGN PATENT DOCUMENTS

CN    101685511    3/2010
CN    103778531    5/2014
(Continued)

OTHER PUBLICATIONS

"Design and Evaluatiojn of a Mobile user interaface for older adults: Naviation Interaction and visual design recommendations" Science direct. (Year: 2011).*
(Continued)

*Primary Examiner* — Bruce I Ebersman
(74) *Attorney, Agent, or Firm* — Nixon & Vanderhye, P.C.

(57) ABSTRACT

A user terminal device is disclosed. The user terminal device comprises: a communication unit for implementing communication between at least one other user terminal device and
(Continued)

a terminal for payment; a display unit for displaying a UI screen for a payment; a user input unit for inputting information on payment means and a payment amount on the UI screen; and a processor for controlling a communication unit for receiving, from at least one other user terminal device, information on payment means and a payment amount input in the at least one other user terminal device and, on the basis of information input through the user input unit and received information, transmitting payment requests respectively corresponding to the user terminal device and the at least one other user terminal device to the terminal for payment.

12 Claims, 12 Drawing Sheets

(51) Int. Cl.
    *G06Q 20/10*   (2012.01)
    *G01S 11/00*   (2006.01)
    *H04W 88/02*   (2009.01)
    *G06Q 20/40*   (2012.01)
    *G06Q 20/20*   (2012.01)

(52) U.S. Cl.
    CPC ............ *G06Q 20/22* (2013.01); *G06Q 20/32* (2013.01); *G06Q 20/322* (2013.01); *G06Q 20/327* (2013.01); *G06Q 20/405* (2013.01); *H04W 88/02* (2013.01); *G06Q 20/202* (2013.01); *G06Q 20/3229* (2013.01)

(58) Field of Classification Search
    CPC .. G06Q 20/327; G06Q 20/405; G06Q 20/202; G06Q 20/3229; H04W 88/02
    See application file for complete search history.

(56) References Cited

U.S. PATENT DOCUMENTS

| | | | | |
|---|---|---|---|---|
| 9,230,440 | B1* | 1/2016 | Penilla | B60L 53/66 |
| 9,602,567 | B2* | 3/2017 | Trachtenberg | H04L 67/1097 |
| 9,619,831 | B1* | 4/2017 | Kumar | G06Q 20/20 |
| 9,665,858 | B1* | 5/2017 | Kumar | G06Q 20/3224 |
| 9,875,469 | B1* | 1/2018 | Chin | G06Q 20/14 |
| 9,972,239 | B2* | 5/2018 | Trachtenberg | H04N 5/63 |
| 10,169,769 | B1* | 1/2019 | Mocko | G06Q 30/0205 |
| 10,692,149 | B1* | 6/2020 | Loo | G06Q 40/08 |
| 10,719,826 | B2* | 7/2020 | Kim | G06Q 20/204 |
| 2002/0103753 | A1* | 8/2002 | Schimmel | G06Q 20/04 705/39 |
| 2008/0082420 | A1* | 4/2008 | Kargman | G06Q 10/10 705/14.27 |
| 2012/0166332 | A1* | 6/2012 | Naaman | G06Q 20/102 705/40 |
| 2013/0085931 | A1 | 4/2013 | Runyan | |
| 2013/0159173 | A1 | 6/2013 | Sivaraman et al. | |
| 2013/0346290 | A1 | 12/2013 | Vellozo Luz et al. | |
| 2014/0180929 | A1* | 6/2014 | Ohnishi | G06Q 20/38215 705/64 |
| 2014/0351118 | A1* | 11/2014 | Zhao | G06Q 20/3224 705/40 |
| 2014/0351130 | A1* | 11/2014 | Cheek | G06Q 20/29 705/44 |
| 2015/0066765 | A1 | 3/2015 | Banks et al. | |
| 2015/0095129 | A1 | 4/2015 | Daigle | |
| 2015/0127526 | A1 | 5/2015 | Ye et al. | |
| 2015/0154634 | A1 | 6/2015 | Chiu et al. | |

FOREIGN PATENT DOCUMENTS

| | | |
|---|---|---|
| CN | 103903161 | 7/2014 |
| CN | 103927654 | 7/2014 |
| CN | 104603808 | 5/2015 |
| JP | 2002-183628 | 6/2002 |
| JP | 2003-099685 | 4/2003 |
| JP | 2008-107874 | 5/2008 |
| KR | 10-2012-0033319 | 4/2012 |
| KR | 10-2012-0108447 | 10/2012 |
| KR | 10-2012-0111095 | 10/2012 |
| KR | 10-1238935 | 3/2013 |
| KR | 10-2014-0065700 | 5/2014 |
| KR | 10-2014-0096208 | 8/2014 |
| KR | 10-2015-0040424 | 4/2015 |

OTHER PUBLICATIONS

Extended European Search Report dated Apr. 20, 2018 in European Patent Application No. 16800355.6.
International Search Report for PCT/KR2016/005662, dated Aug. 30, 2016, 4 pages.
Written Opinion of the ISA for PCT/KR2016/005662, dated Aug. 30, 2016, 15 pages.
Communication pursuant to Artice 94(3) EPC dated Apr. 16, 2020 in European Patent Application No. 16800355.6.
First Office Action dated Aug. 25, 2020 in Chinese Patent Application No. 201680030573.6 and English-language translation.
Second Office Action dated Feb. 22, 2021 in counterpart Chinese Patent Application No. 201680030573.6 and English-language translation
Summons to Oral Proceedings dated Jun. 23, 2021 issued in counterpart European Patent Application No. 16800355.6.

\* cited by examiner

USER TERMINAL DEVICE, TERMINAL FOR PAYMENT, AND METHOD AND SYSTEM FOR PAYMENT USING THE USER TERMINAL DEVICE AND TERMINAL FOR PAYMENT

This application is the U.S. national phase of International Application No. PCT/KR2016/005662 filed 27 May 2016, which designated the U.S. and claims the benefit of U.S. 62/166,914 filed 27 May 2015, and claims priority to KR 10-2016-0065805 filed 27 May 2016, the entire contents of each of which are hereby incorporated by reference.

TECHNICAL FIELD

The present general inventive concept generally relates to a user terminal device, a terminal for payment, and a method and system for payment using the same, and more particularly, to a user terminal device that processes a certain amount of payment, a terminal for payment, and a method and system for payment using the same

DESCRIPTION OF RELATED ART

In a current conventional payment system, a card company establishes and operates a card payment system in association with a terminal for payment, for example, Point of Sales (POS), and a buyer provides a seller with purchase information consisting of a purchase list and a purchase amount to request for payment.

Recently, an application-type mobile card has been developed. Unlike the conventional card that stores card information in a Universal Subscriber Identity Module (USIM), this mobile card operates in the manner of registering the conventional card (credit card or debit card) in an application of a smart phone without any issuance procedure. The mobile card is widely used in online/offline affiliated stores in this regard.

However, there are many cases where several people have a meal in a restaurant, any of them pays a bill, and then the people settle up later, which is inconvenient. When they split a bill and pay individually (Dutch treat), a payment means of each person may vary (mobile card, point, or coupon), and it takes a lot of time. Further, it is inefficient since an approval fee occurs for each transaction in a terminal for payment.

Accordingly, there is a necessity for a method for processing payment conveniently and efficiently when several people perform payment individually in one business place.

SUMMARY

The present disclosure has been provided to address the aforementioned and other problems and disadvantages occurring in the related art, and an aspect of the present disclosure provides a user terminal device that enables a plurality of users to split and pay a purchase amount more conveniently, a terminal for payment, and a method and system using the same.

According to an embodiment of the present disclosure, there is provided a user terminal device. The user terminal device includes a communication unit configured to communicate with at least one other user terminal device and a terminal for payment, a display unit configured to display a User Interface (UI) screen for payment, a user input unit configured to input information on a payment means and a payment amount in the UI screen, and a processor configured to control the communication unit to receive, from the at least one other user terminal device, information on a payment means and a payment amount inputted from the at least one other user terminal device and transmit payment requests respectively corresponding to the user terminal device and the at least one other user terminal device to the terminal for payment based on the information inputted through the user input unit and the received information.

The processor may receive a total payment amount to be paid from the terminal for payment through the communication unit.

The processor may add up payment amounts based on the information inputted through the user input unit and the information received from the at least one other user terminal device and in response to the added payment amounts being consistent with the received total payment amount, control the communication unit to transmit the payment requests to the terminal for payment.

The processor may control to receive payment means recommendation information respectively corresponding to the user terminal device and the at least one other user terminal device from the terminal for payment through the communication unit, display the payment means recommendation information corresponding to the user terminal device, and transmit the payment means recommendation information corresponding to the at least one other user terminal device to the at least one other user terminal device.

The processor may receive notification information on completion of the payment approval from the terminal for payment.

According to an embodiment of the present disclosure, there is provided a method for performing payment using a user terminal device. The method includes displaying a User Interface (UI) screen for payment, inputting information on a payment means and a payment amount in the UI screen and receiving, from at least one other user terminal device, information on a payment means and a payment amount inputted from the at least one other user terminal device, and transmitting payment requests respectively corresponding to the user terminal device and the at least one other user terminal device to the terminal for payment based on the inputted information and the received information.

The method may further include receiving a total payment amount to be paid from the terminal for payment.

The transmitting may include figuring up payment amounts based on the inputted information and the information received from the at least one other user terminal device and in response to the added payment amounts being consistent with the received total payment amount, transmitting the payment requests to the terminal for payment.

The method may further include receiving payment means recommendation information respectively corresponding to the user terminal device and the at least one other user terminal device from the terminal for payment and displaying the payment means recommendation information corresponding to the user terminal device and transmitting the payment means recommendation information corresponding to the at least one other user terminal device to the at least one other user terminal device.

The method may further include receiving notification information on completion of the payment approval from the terminal for payment.

According to an embodiment of the present disclosure, there is provided a terminal for payment for processing payment. The terminal for payment includes a communication unit configured to communicate with a first user terminal device and a processor configured to, in response to receiving payment requests including information on a payment means and a payment amount respectively being inputted from the first user terminal device and at least one second user terminal device from the first user terminal device, integrate and process the payment requests respectively corresponding to the first user terminal device and the at least one second user terminal device as single transaction.

The processor may control the communication unit to transmit payment approval requests on payment amounts inputted from the first user terminal device and the at least one second user terminal device to external servers respectively corresponding to the payment means inputted from the first user terminal device and the at least one second user terminal device.

The processor may control the communication unit to transmit a total payment amount to be paid to the first user terminal device.

The processor may control the communication unit to transmit payment means recommendation information corresponding to the first user terminal device and the at least second user terminal device to the first user terminal device and the at least second user terminal device.

In response to a payment approval being completed with respect to any of the first user terminal device and the at least one second user terminal device, the processor may control the communication unit to transmit notification information on completion of the payment approval to the first user terminal device.

The terminal for payment may further include a distance measurement sensor. The processor may determine a distance between the terminal for payment and a plurality of user terminal devices by using the distance measurement sensor and transmit a control signal for enabling a user terminal device which is the closest to the terminal for payment to operate as the first user terminal device.

According to an embodiment of the present disclosure, there is provided a method for performing payment using a terminal for payment. The method includes receiving, from a first user terminal device, payment requests including information on a payment means and a payment amount respectively being inputted from the first user terminal device and at least one second user terminal device and integrating and processing the payment requests respectively corresponding to the first user terminal device and the at least one second user terminal device as single transaction.

The method may further include respectively transmitting payment approval requests on payment amounts inputted from the first user terminal device and the at least one second user terminal device to servers respectively corresponding to payment means inputted from the first user terminal device and the at least one second user terminal device.

The method may further include transmitting a total payment amount to be paid to the first user terminal device.

According to an embodiment of the present disclosure, there is provided a payment system including a user terminal device and a terminal for payment. The payment system includes a user terminal device configured to receive information on a payment means and a payment amount in a User Interface (UI) screen for payment, receive, from at least one other user terminal device, information on a payment means and a payment amount inputted from the at least one user terminal device, and transmit payment requests respectively corresponding to the user terminal device and the at least one other user terminal device to the terminal for payment based on the inputted information and the received information and a terminal for payment configured to integrate and process the payment requests respectively corresponding to the user terminal device and the at least one other user terminal device as single transaction.

According to the above-described various embodiments of the present disclosure, payment requests with different payment means from a plurality of users may be processed in a lump sum, thereby increasing user convenience.

DETAILED DESCRIPTION OF EXAMPLE EMBODIMENTS

Figure 1:
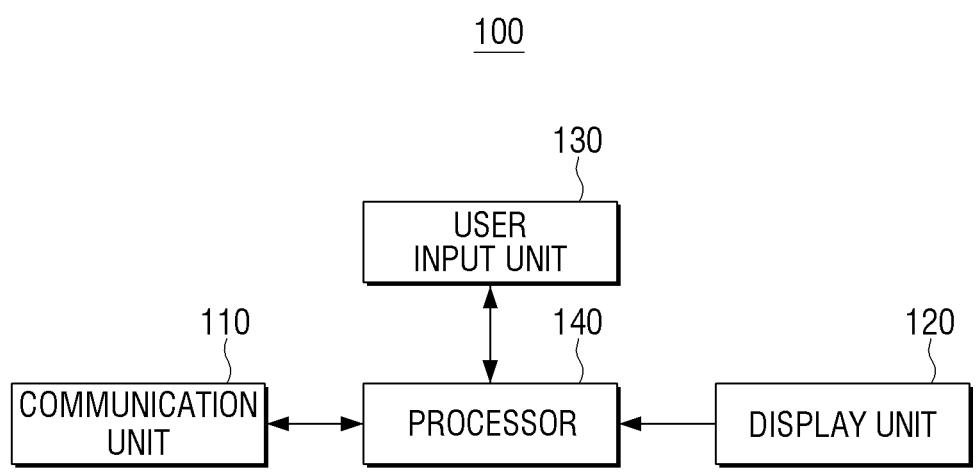
FIG. 1 is a block diagram illustrating a simple structure of a user terminal device according to an embodiment disclosed herein.

Hereinafter, a description method of the present disclosure and accompanying drawings will be given in advance of presenting detailed embodiments of the present disclosure.

The terms used in the following description and claims are widely used common expressions selected by considering functions in various embodiments of the present disclosure. However, such terms may vary depending upon an intention of a person having ordinary skill in the art (hereinafter referred to as 'those skilled in the art'), legal/technical interpretations, or advent of new technologies. Some of the terms were selected arbitrarily by an applicant, and the terms may be interpreted as defined herein. Unless otherwise defined, the terms may be interpreted based on overall descriptions of the present disclosure and common technical knowledge in the art.

In the following description, like drawing reference numerals and symbols refer to the like elements which perform substantially the same function, even in different drawings, for convenience in explanation and for better understanding. That is, although a plurality of drawings share elements having the same reference numerals, the plurality of drawings do not relate to one embodiment.

In the following description and claims, a term including an ordinal, such as, 'first' or 'second,' may be used to distinguish elements. The ordinal is used to distinguish the same or similar elements and does not limit the meaning of the term. For instance, ordinals do not affect an order of use or an order of arrangement of elements expressed with the ordinals. Respective ordinals may be replaced with each other, if necessary.

A term in a singular form includes a plural form unless it is intentionally written that way. A term, such as, 'include' or 'form,' refers to the disclosed features, numbers, steps, operations, elements, parts, or combinations thereof and is not intended to exclude any possibilities of existence or addition of one or more other features, numbers, steps, operations, elements, parts, or combinations thereof.

A term 'module,' 'unit,' or 'part' refers to an element that performs one or more functions or operations. The 'module,' 'unit,' or 'part' may be realized as hardware, software, or combinations thereof. A plurality of 'modules,' 'units,' or 'parts' may be integrated into at least one module and realized as at least one processor (not shown), except for a case where the respective 'modules' or 'units' need to be realized as discrete specific hardware.

In the following embodiments, when it is described that one part is connected to another part, the connection includes a direct connection between the parts and an indirection connection through other medium. Further, the expression that a part 'includes' a certain element signifies that the part may further include other elements on top of the certain element, not excluding the other elements than the certain element, unless otherwise described.

Certain embodiments are described below in greater detail with reference to the accompanying drawings.

FIG. 1 is a block diagram illustrating a simple structure of a user terminal device according to an embodiment disclosed herein.

Referring to FIG. 1, a user terminal device 100 according to an embodiment disclosed herein includes a communication unit 110, a display unit 120, a user input unit 130, and a processor 140.

The user terminal device 100 according to an embodiment disclosed herein may be realized as an electronic device which is capable of performing mobile payment. For example, the user terminal device 100 may include at least one of a smart phone, a tablet Personal Computer (PC), a mobile phone, a video phone, an e-book reader, a laptop PC, a netbook computer, a Personal Digital Assistant (PDA), a Portable Multimedia Player (PMP), and a wearable device. The wearable device may include electronic appcessory, a smartwatch, or the like.

Hereinafter, the embodiments disclosed herein will be provided based on the assumption that the user terminal device 100 is a smart phone, unless otherwise described. However, the following embodiments are not limited thereto, and as described above, an embodiment where the user terminal device is realized as various types of devices is also included in the technical concept of the present disclosure, needless to say.

The communication unit 110 communicates with a terminal for payment 200 and at least one other user terminal device. The communication unit 110 may communicate with the terminal for payment 200 and the at least one other user terminal device according to diverse communication methods using Radio Frequency (RF) or Infrared (IR), such as, Bluetooth (BT), Wireless-Fidelity (Wi-Fi), Zigbee, Near Field Communication (NFC), and so on. For this operation, the communication unit 110 may include a communication element having at least one of a Zigbee communication element, a BT communication element, and a Wi-Fi communication element.

The communication unit 110 may receive, from the at least one other user terminal device, information on a payment means and a payment amount inputted from the at least one other user terminal device and transmit the received information to the terminal for payment 200 together with the information on a payment means and a payment amount inputted from the user terminal device 100.

The communication unit 110 may communicate with a server 300 connected with the terminal for payment 200 and receive a notification on a payment approval request from the server 300. In this case, the server 300 may store information on a user who requested for payment and may be a server in a company that approves payment according to a payment means.

The display unit 120 displays various contents and a User Interface (UI). Particularly, the display unit 120 may display a UI screen for payment. The UI screen for payment may be a screen where a mobile payment application installed in the user terminal device 100 is executed.

The display unit 120 may be realized as a Liquid Crystal Display (LCD), Organic Light-Emitting Diodes (OLED), a transparent display, a flexible display, or the like, but not limited thereto. Further, the display unit 120 may include a driver circuit or a backlight unit which may be realized as an amorphous-silicon Thin Film Transistor (a-si TFT), a Low Temperature Poly Silicon (LTPS) TFT, or an organic TFT (OTFT).

The user input unit 130 detects a user interaction for controlling overall operations of the user terminal device 100. The user input unit 130 may receive the information on a payment means and a payment amount related to a purchase amount.

In response to the display unit 120 of the user terminal device 100 being realized as a touch screen with a touch sensor, the user input unit 130 may be realized as software. In this case, the information on a payment means and a payment amount may be inputted by a touch input or a drag input on the touch screen, and the display unit 120 may operate as the user input unit 130.

The processor 140 controls overall operations of the user terminal device 100. Particularly, the processor 140 may receive the information on a payment means (card, point, or coupon) and a payment amount inputted from at least one other user terminal device, from the at least one other user terminal device. The processor 140 may control the communication unit 110 to integrate and transmit a plurality of payment requests based on the information on a payment means and a payment amount inputted through the user input unit 130 and the information on a payment means and a payment amount received from the at least one other user terminal device to the terminal for payment 200.

In this case, in response to other user terminal devices to perform payment being selected in the UI screen, the processor 140 may group the selected other user terminal devices and receive the information on a payment means and a payment amount from the grouped other user terminal devices.

Hereinafter, a detailed description on the operations of the user terminal device 100 will be provided with reference to FIG. 2.

Figure 2:
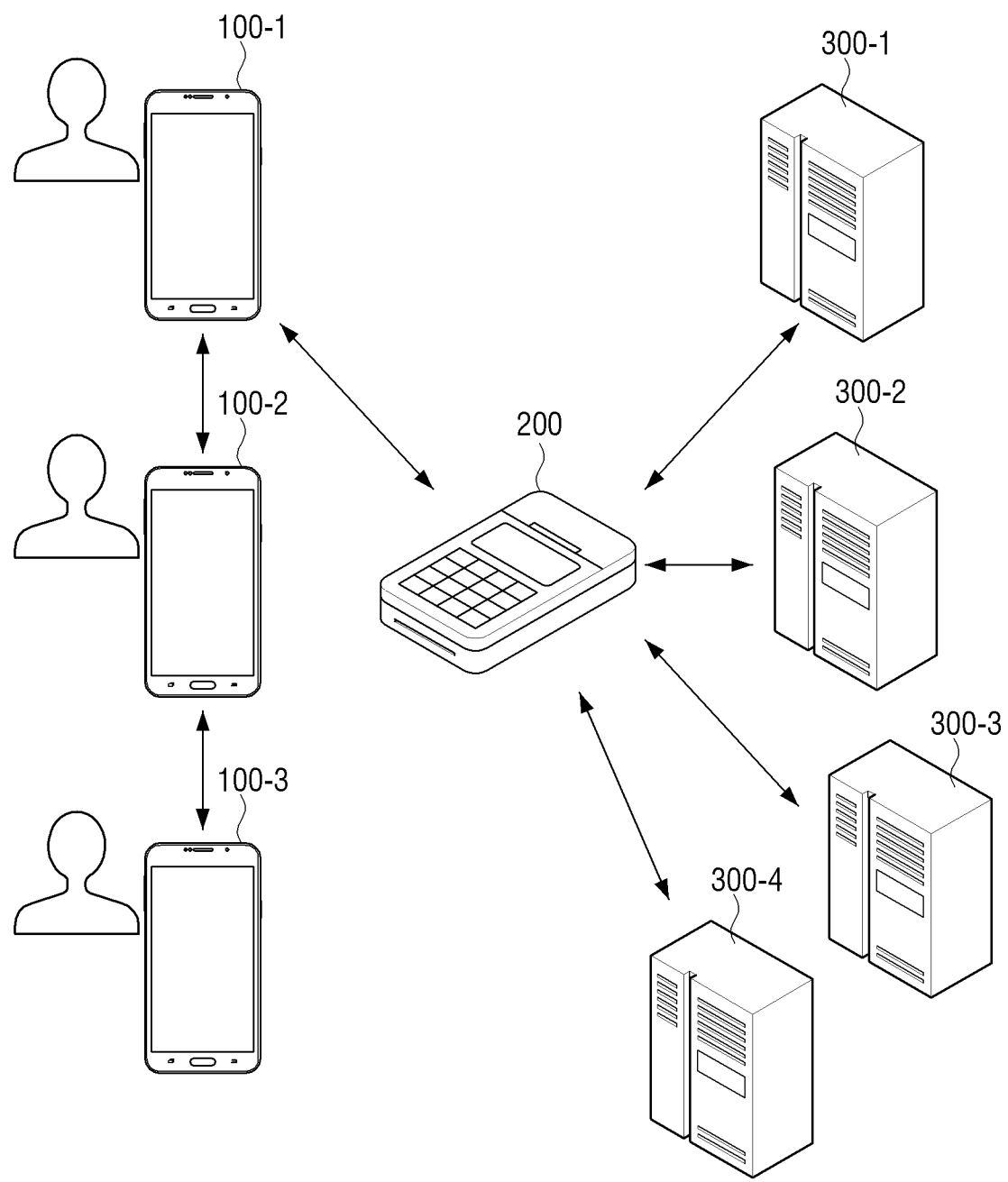
FIG. 2 is a schematic diagram illustrating a plurality of user terminal devices, a terminal for payment, and a payment system using servers according to an embodiment disclosed herein.

FIG. 2 is a schematic diagram illustrating a plurality of user terminal devices, a terminal for payment, and a payment system using servers according to an embodiment disclosed herein. FIG. 2 illustrates an example where payment requests from three users are integrated and processed.

As illustrated in FIG. 2, when three customers have a meal in a restaurant and want to pay individually (Dutch treat), the terminal for payment 200 may select any user terminal device 100-1 from among first to third user terminal devices 100-1 to 100-3 of the respective customers as a representative terminal for payment to request for payment with respect to the terminal for payment 200. In this case, a user terminal device that transmitted a particular control signal to the terminal for payment 200 through an application or the like may be selected as the representative terminal for payment from among the first to third user terminal devices 100-1 to 100-3. Further, a user terminal device which is the closest to the terminal for payment 200 may be selected as the representative terminal for payment. In this case, a distance between the terminal for payment 200 and the first to third user terminal devices 100-1 to 100-3 may be measured by using a Received Signal Strength Indicator (RSSI) value.

In response to the representative terminal for payment being selected, the terminal for payment 200 may transmit information on a total payment amount to be paid to the representative terminal for payment.

The first to third user terminal devices 100-1 to 100-3 may receive the information on a payment means and a payment amount in the UI screen for payment through the user input unit 130. For example, in response to the total payment amount received from the terminal for payment 200 being KRW 30,000, the first user terminal device 100-1 may receive an input of Card AA as the payment means and KRW 10,000 as the payment amount. The second user terminal device 100-2 may receive an input of Point BB as the payment means and KRW 10,000 as the payment amount. Further, the third user terminal device 100-3 may receive an input of Card CC and a coupon as the payment means and also receive an input of KRW 5,000 as the payment amount to be paid by Card CC and KRW 5,000 as the payment amount to be paid by the coupon.

The first user terminal device 100-1 selected as the representative terminal for payment may receive the information on a payment means and a payment amount inputted from the respective other user terminal devices 100-2, 100-3 from the other user terminal devices 100-2, 100-3. Subsequently, the first user terminal device 100-1 may integrate the information on a payment means and a payment amount inputted from the respective user terminal devices 100-1 to 100-3 and transmit the payment requests respectively corresponding to the respective user terminal devices to the terminal for payment 200.

In this case, the first user terminal device 100-1 may transmit the payment requests corresponding to the respective user terminal devices 100-1 to 100-3 individually or integrate the payment requests respectively corresponding to the user terminal devices 100-1 to 100-3 and transmit an integrated payment request to be processed as a single transaction.

The processor 140 may control the communication unit 110 to add up the payment amount (KRW 10,000) inputted through the user input unit 130 and the payment amount (KRW 20,000) received from the other user terminal devices 100-2, 100-3. In response to the added payment amounts being inconsistent with the total payment amount (KRW 30,000) received from the terminal for payment 200, the processor 140 may control the communication unit 110 not to transmit the payment requests to the terminal for payment 200. In response to the added payment amounts being consistent with the total payment amount (KRW 30,000) received from the terminal for payment 200, the processor 140 may control the communication unit 110 to transmit the payment requests to the terminal for payment 200.

The terminal for payment 200 that received the payment requests may process the payment requests of the respective user terminal devices 100-1 to 100-3 and transmit a payment approval request for asking the servers 300-1 to 300-4 corresponding to the payment requests of the respective user terminal devices 100-1 to 100-3 to approve payment. In this case, the terminal for payment 200 may integrate and process the payment requests corresponding to the plurality of user terminal devices 100-1 to 100-3 received from the first user terminal device 100-1 as a single transaction. The payment amounts inputted from the respective user terminal devices 100-1 to 100-3 may be integrated and processed as one payment request in the terminal for payment 200 according to the payment means inputted from the respective user terminal devices 100-1 to 100-3. The payment amounts inputted from the respective user terminal devices 100-1 to 100-3 may be integrated and processed as one payment request in the terminal for payment 200 according to the payment means inputted from the respective user terminal devices 100-1 to 100-3.

The terminal for payment 200 may transmit a payment approval request including card information and information on a payment amount to the server 300-1 of a card company that issued Card AA which is the payment means of the first user terminal device 100-1. Further, the terminal for payment 200 may transmit a payment approval request including point information and information on a payment amount to the server 300-2 of a point management company that issued Point BB which is the payment means of the second user terminal device 100-2.

The terminal for payment 200 may transmit a payment approval request including card information and information on a payment amount to the server 300-3 of a card company that issued Card BB which is the payment means of the third user terminal device 100-3 and transmit a payment approval request to the server 300-4 of a coupon company that issued the coupon which is another payment means of the third user terminal device 100-3. In this case, the card information, the point information, and the coupon information may include its own identification information, and the servers 300-1 to 300-4 may identify a user based on the identification information and perform a payment approval operation.

In response to the payment for any of the first to third user terminal devices 100-1 to 100-3 being approved, the server that approved the payment may transmit a notification information on completion of the payment approval to the terminal for payment 200 or to a user terminal device corresponding to the approved payment request. By way of example, in response to the payment approval being completed with respect to the payment means and the payment amount inputted from the second user terminal device 100-1, the server 300-2 of Card company BB may transmit the notification information on completion of the payment approval to the second user terminal device 100-2 or to the terminal for payment 200. In response to the notification information on completion of the payment approval being transmitted to the terminal for payment 200, the terminal for payment 200 may transmit the notification information on completion of the payment approval to the second user terminal device 100-2.

In response to the notification information on completion of the payment approval being transmitted from the servers 300-1 to 300-4 to the terminal for payment 200, the terminal for payment 200 may transmit the notification information on completion of the payment approval to the first user terminal device 100-1 which is the representative payment device only when all payment approvals corresponding to the entire user terminal device 100-1 to 100-3 are completed.

Figure 3:
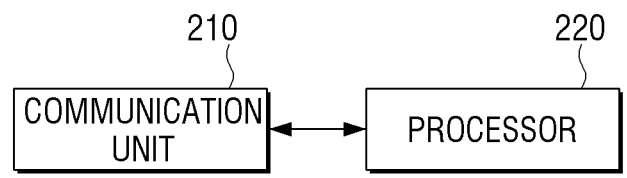
FIG. 3 is a block diagram illustrating a simple structure of a terminal for payment according to an embodiment disclosed herein.

FIG. 3 is a block diagram illustrating a simple structure of a terminal for payment according to an embodiment disclosed herein.

Referring to FIG. 3, a terminal for payment 200 according to an embodiment disclosed herein includes a communication unit 210 and a processor 220.

The communication unit 210 communicates with any one of a plurality of user terminal devices. The communication unit 210 may include a first communication unit (not shown) for communication with a user terminal device and a second communication unit (not shown) for communication with a server that approves payment.

The first communication unit performs communication in the same manner as the user terminal device 100 of FIG. 1, and the operation is the same as described above in FIG. 1. Accordingly, a repeated description is omitted.

According to an embodiment disclosed herein, the terminal for payment 200 may further include a distance measurement sensor (not shown). The processor 140 may determine a distance between the plurality of user terminal devices and the terminal for payment 200 by using the distance measurement sensor and transmit a control signal for enabling a first user terminal device which is the closest to the terminal for payment 200 to operate as the representative payment device to the first user terminal device. As an example of the distance measurement sensor, the first communication unit may include a BT element. The first communication unit may measure a RSSI value from the user terminal device by using the BT element and measure a distance between the user terminal device and the terminal for payment 200. The terminal for payment 200 may select the closest user terminal device as the representative payment device. A detailed description on this operation will be provided below.

The second communication unit may communicate with the server that approves payment and transmit a payment approval request. The second communication unit may be connected to the server through a wired and/or wireless communication network, such as, an internet network, a mobile communication network, a public communication network, and so on. The second communication unit may transmit the payment approval request to the server, and the server may identify the user according to the payment approval request and approve the payment. Accordingly, the second communication unit may receive information on completion of the payment approval from the server.

The processor 220 controls overall operations of the terminal for payment 200. The processor 220 may transmit the total payment amount to be paid to the first user terminal device through the communication unit 210.

Further, the processor 220 may transmit payment means recommendation information corresponding to the first user terminal device and at least one second user terminal device to the first user terminal device and the at least one second user terminal device through the communication unit 210. In this case, the at least one second user terminal device may be a user terminal device grouped with the first user terminal device. As an example, there may be an event offering a 10% discount when a customer performs payment with a card issued by Card company XX affiliated with a business place where the terminal for payment 200 is installed. In this case, the processor 220 may transmit information for recommending Card XX as a payment means to the first user terminal device which is the representative payment device along with event information. The first user terminal device may transmit the received information to the grouped second user terminal device.

The payment means recommendation information may vary depending upon a user terminal device. By way of example, a user terminal device using a communication service of a certain communication carrier may use the points provided by the carrier up to KRW 10,000. This information may be transmitted only to a user terminal device using the communication service of the carrier.

The first user terminal device which communicates with the terminal for payment 200 may transmit payment requests including the information on a payment means and a payment amount inputted from each of the first user terminal device and the at least one second user terminal device. In this case, the processor 220 may integrate and process the payment requests respectively corresponding to the first user terminal device and the at least one second user terminal device as single transaction.

The processor 220 may transmit the payment approval request for the payment amounts inputted from the first user terminal device and the at least one second user terminal device to external servers respectively corresponding to the payment means inputted from the first user terminal device and the at least one second user terminal device, through the communication unit 210.

Figure 4:
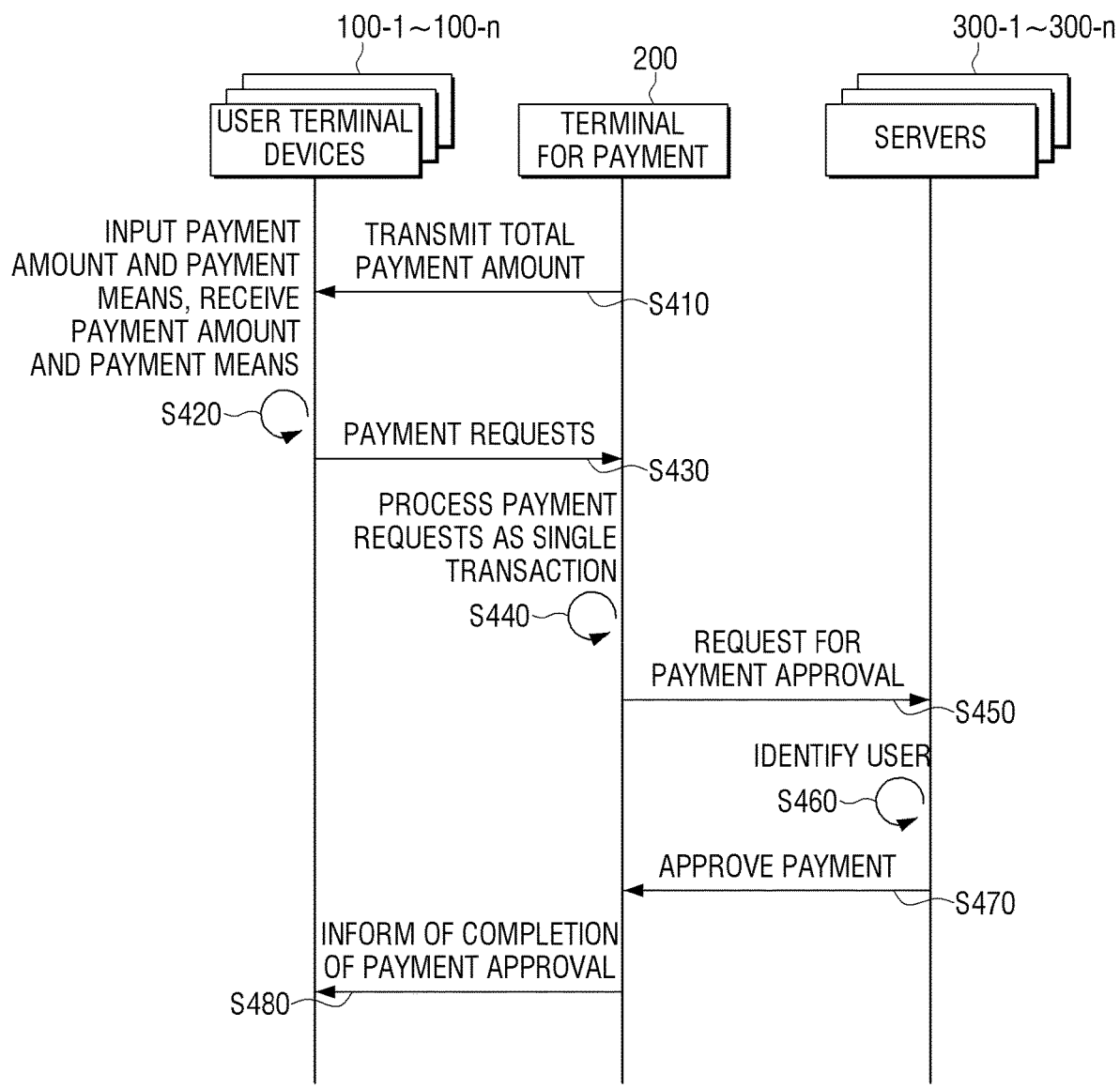
FIG. 4 is a sequence diagram provided to describe an interaction of a plurality of user terminal devices, a terminal for payment, and servers according to an embodiment disclosed herein.

FIG. 4 is a sequence diagram provided to describe an interaction of a plurality of user terminal devices, a terminal for payment, and servers according to an embodiment disclosed herein.

A business operator may input a total payment amount to be paid in the terminal for payment 200 and transmit information on the total payment amount to any user terminal device determined as the representative payment device from among the user terminal devices 100-1 to **100-*n* of a plurality of customers (S410). In response to any one of the plurality of customers opening an application in the user terminal device and selecting his/her user terminal device as the representative payment device, the user terminal device may be determined as the representative payment device, and information on this operation may be transmitted to the terminal for payment 200. Further, the terminal for payment 200 may determine the closest user terminal device among the plurality of user terminal devices 100-1 to 100-*n* as the representative payment device by using the distance measurement sensor. In this case, the terminal for payment 200 may receive an RSSI value from the plurality of user terminal devices 100-1 to 100-*n* and measure a distance between the terminal for payment 200 and each of the plurality of user terminal devices 100-1 to 100-*n***.

The first user terminal device 100-1 determined as the representative payment device may select and group the user terminal devices 100-2 to **100-*n* to perform payment in the UI screen of the application. The first user terminal device 100-1 may receive the information on a payment means and a payment amount from a user of the first user terminal device 100-1 through the user input unit 130 and receive the information on a payment means and a payment amount that the users of the grouped user terminal devices 100-2 to 100-*n* input in the second to n(th) user terminal devices 100-2 to 100-*n*, respectively (S420**).

The first user terminal device 100-1 may integrate the inputted and received information on a payment means and a payment amount and transmit the payment requests corresponding to the respective user terminal devices 100-1 to 100-*n* to the terminal for payment 200 (S430). The terminal for payment 200 that received the payment requests may process the received payment requests as single transaction like one integrated payment request (S440).

The terminal for payment 200 may transmit the payment approval request to the servers 300-1 to 300-*n* that may approve the payment according to the payment means corresponding to the respective user terminal devices 100-1 to 100-*n* (S450). The servers 300-1 to 300-*n* may identify the user with respect to the received payment approval request and approve the payment (S460).

In response to the payment being approved, the respective servers 300-1 to 300-*n* may transmit notification information on completion of the payment approval to the terminal for payment 200 (S470). In response to the payment approval being completed for all of the grouped user terminal devices 100-1 to 100-*n*, the terminal for payment 200 may transmit a message informing of completion of all payment approvals to the first user terminal device 100-1 which is the representative payment device (S480).

FIGS. 5 to 8 are diagrams provided to describe a User Interface (UI) screen for executing integrated payment in a user terminal device, according to an embodiment disclosed herein.

Figure 5:
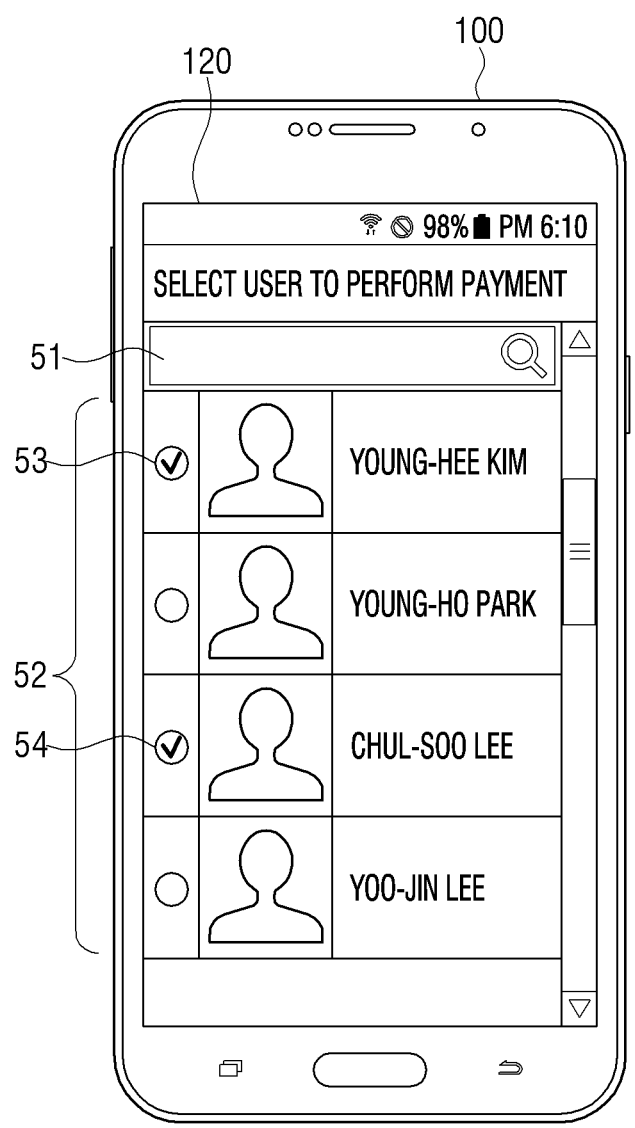
FIGS. 5 to 9 are diagrams provided to describe a User Interface (UI) screen for executing integrated payment in a user terminal device, according to an embodiment disclosed herein.

FIG. 5 illustrates a UI screen for grouping users to perform payment according to an embodiment disclosed herein. As illustrated in FIG. 5, in response to an application being executed in the user terminal device 100, a UI screen for selecting a user to perform payment from among a plurality of users registered at the user terminal device 100 may be displayed. The UI screen may include a search box 51 for searching for a user to perform payment and a list 52 for selecting the plurality of users registered at the user terminal device 100. The user may select the users to perform payment from the list 52 and group the users. By way of example, as illustrated in FIG. 5, the user may select radio buttons 53, 54 displayed in the list 52 and select corresponding users (Young-Hee Kim, Young-Ho Park).

Figure 6:
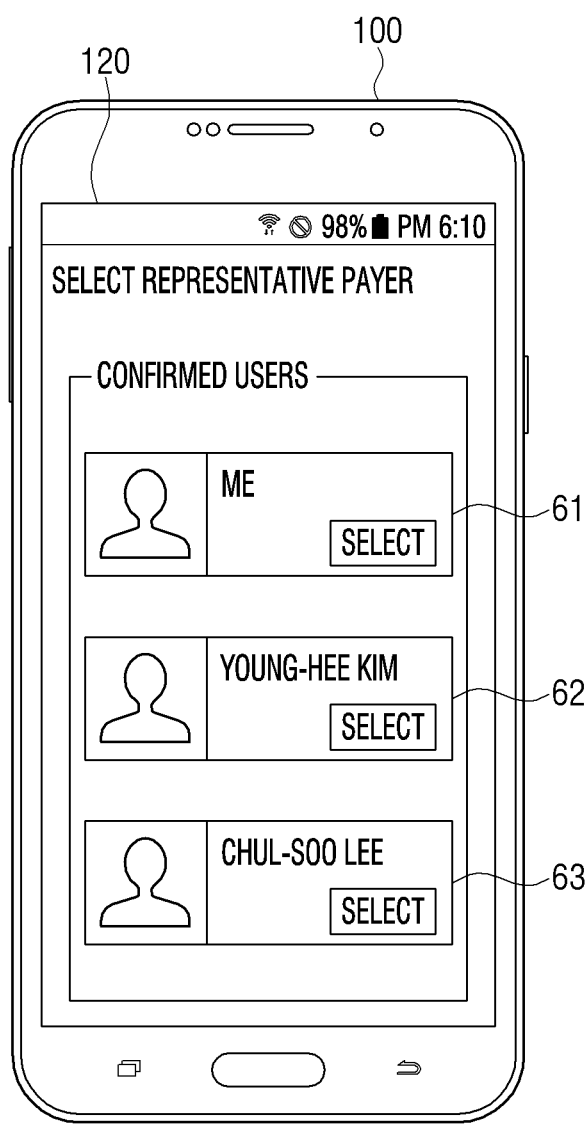

FIG. 6 illustrates a UI screen for selecting a representative payment device according to an embodiment disclosed herein. In response to the users to perform payment being grouped in the user terminal device 100, as illustrated in FIG. 6, a UI screen for selecting a representative payment device to perform payment from among the grouped user terminal devices may be displayed.

In response to the users being grouped, the UI screen may display lists 61 to 63 including the grouped users, and each of the lists 61 to 63 may include a select button for selecting a representative payment device. The user of the user terminal device 100 may select himself/herself or another user as a representative payer by using the displayed select button of each list.

Figure 7:
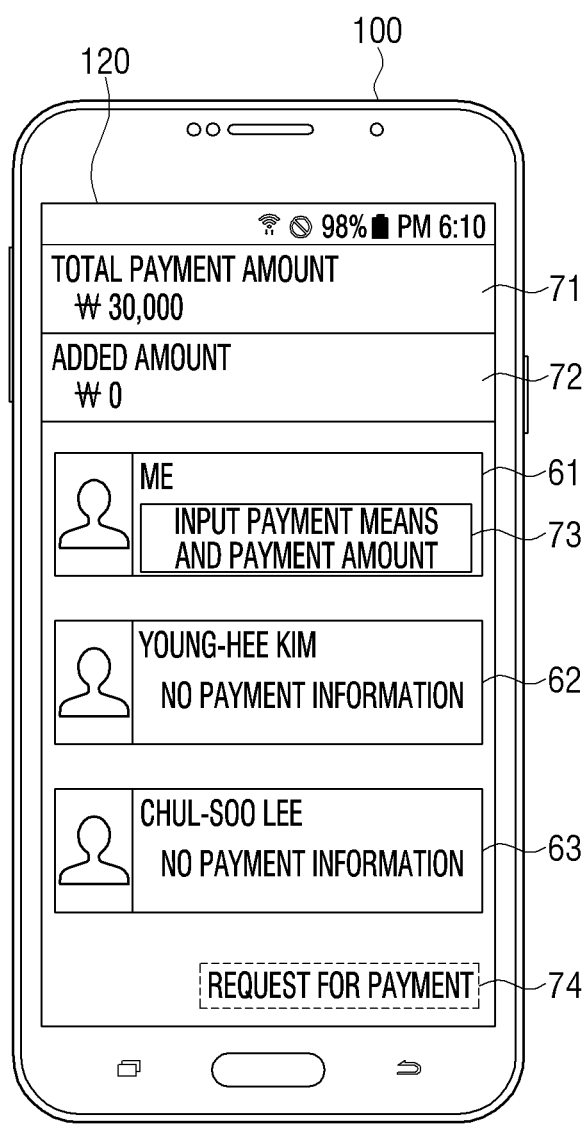

FIG. 7 illustrates a UI screen displaying input information on a payment means and a payment amount in a representative payment device according to an embodiment disclosed herein.

As illustrated in FIG. 7, in response to the user terminal device 100 being selected as the representative payment device, the user terminal device 100 may transmit information that the user terminal device 100 was selected as the representative payment device to the terminal for payment 200, receive information on the total payment amount from the terminal for payment 200, and display the received information in a certain region 71 of the UI screen. The user terminal device 100 may display information on an added amount obtained by adding the payment amount inputted through the user terminal device 100 and the payment amounts received from other user terminal devices in another certain region 72 of the UI screen. Further, the user terminal device 100 may receive the payment means recommendation information from the terminal for payment 200 and display the received information. The payment means recommendation information may vary depending on a user terminal device. In response to receiving the payment means recommendation information on at least one other user terminal device, the processor 140 may control to transmit the received information to the corresponding user terminal device.

In the lists 61 to 63 including the grouped users, the user item 61 of the user terminal device 100 which is the representative payment device may display a button 73 for inputting a payment means and a payment amount. The user items 62, 63 of other grouped user terminal devices may display whether the information on a payment means and a payment amount was received.

As illustrated in FIG. 7, in response to no payment means and payment amount being inputted from the user terminal device 100 or no payment means and payment amount being received from all of the grouped users, a payment request button 74 may be displayed in an inactivated state. In response to the added payment amounts obtained as the payment means and the payment amount are inputted and the payment means and the payment amount of all of the grouped users are received being consistent with the total payment amount, the payment request button 74 may be activated.

Figure 8:
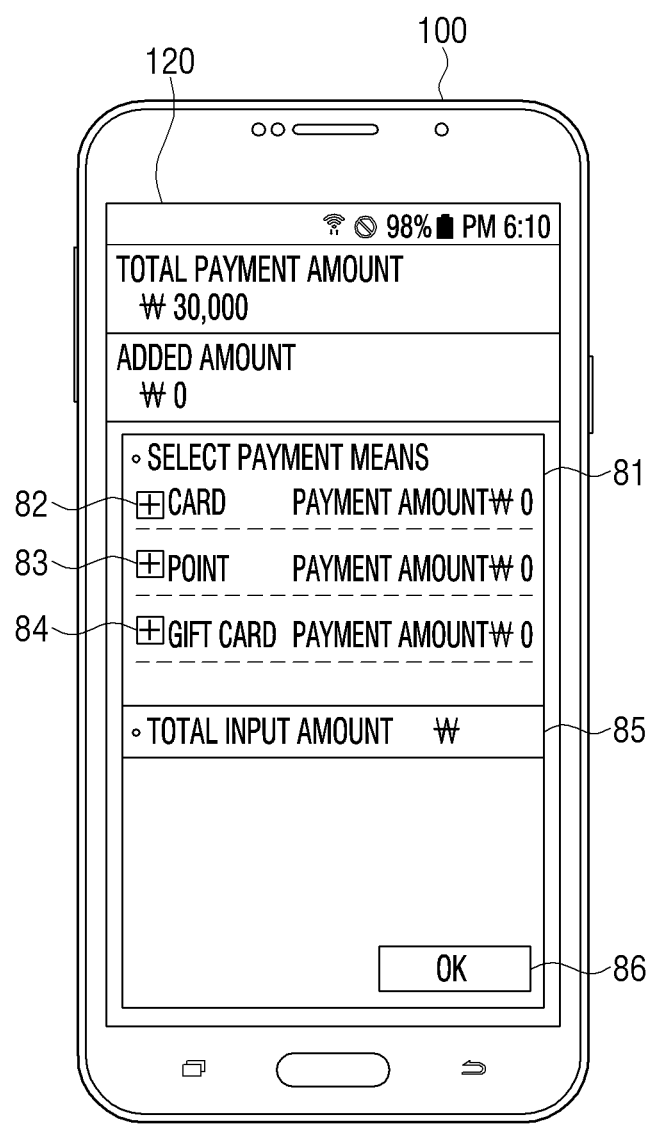

FIG. 8 illustrates a UI screen for inputting a payment means and a payment amount according to an embodiment disclosed herein.

In response to a user input of selecting a payment means and an mount input button 73, the processor 140 may display a payment window for the user to select or input a payment means and a payment amount. The payment window may include a region 81 for selecting the payment means and a payment amount and a region 85 for displaying a total input amount.

The payment means may include various kinds of payment means including a card, a point, a gift card, or a coupon. The card may include a credit card, a debit card, a prepaid card, or the like. The point may include a point reserved by using a card, a point given by joining a certain communication carrier, a cash-back reward point, or the like. The coupon may include a coupon given by an affiliated store where payment occurs, a coupon given by a card company, and so on. In response to the user selecting an icon 82, 83, 84 displayed next to each category of the payment means, a window for selecting a specific payment means may be displayed. The user may select any of the card, points, gift card, and coupon specifically in the window. In response to the specific payment means being selected, the user may input a payment amount corresponding to the selected payment means. In response to a plurality of payment means being selected, the user may input the payment amount for each of the selected payment means.

A region 85 at the lower side of the payment window may display a total input amount. In response to all of the payment means and the payment amounts being selected or inputted, the user may select an OK button 86 to finish selection of the payment means and the payment amounts.

Figure 9:
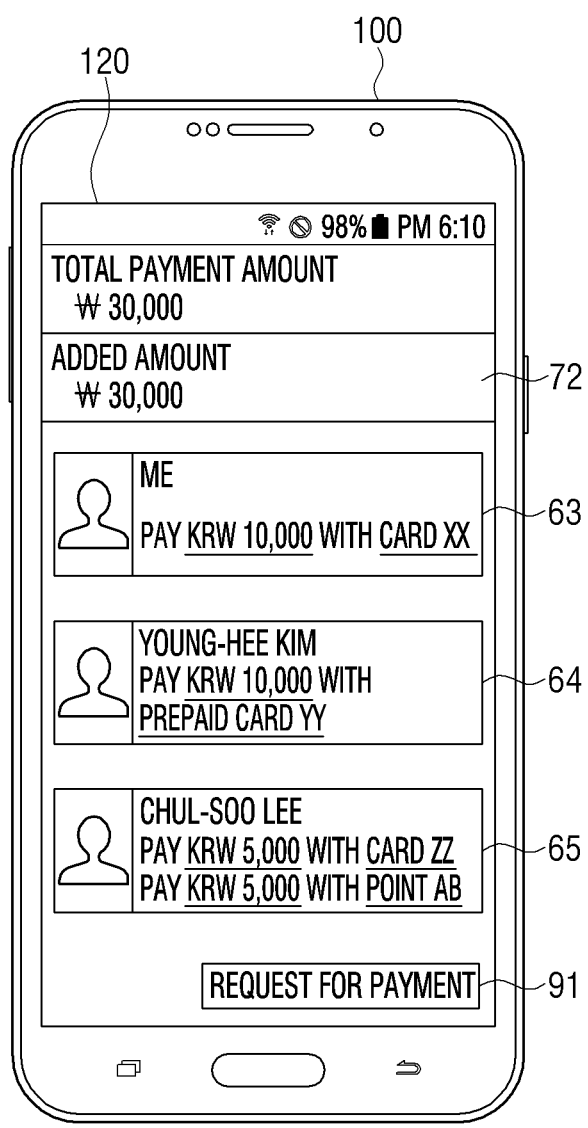

FIG. 9 illustrates a UI screen for displaying input information on a payment means and a payment amount according to another embodiment disclosed herein. As illustrated in FIG. 9, in response to the payment means and the payment amounts being inputted from the user terminal device 100 and the information on the payment means and the payment amounts being received from all of the other user terminal devices, the UI screen may display the information on the payment means and the payment amount for each of the user terminal devices. In this case, a certain region 72 of the UI screen may display the added amount of the payment amount inputted from the user terminal device 100 and the payment amounts received from the other user terminal devices. In response to the added amount being consistent with the total payment amount, the processor 140 may display a payment request button 91 in an activated state. In response to the payment request button 91 being selected, the processor 140 may control to transmit the payment requests corresponding to the respective user terminal devices to the terminal for payment 200.

Figure 10:
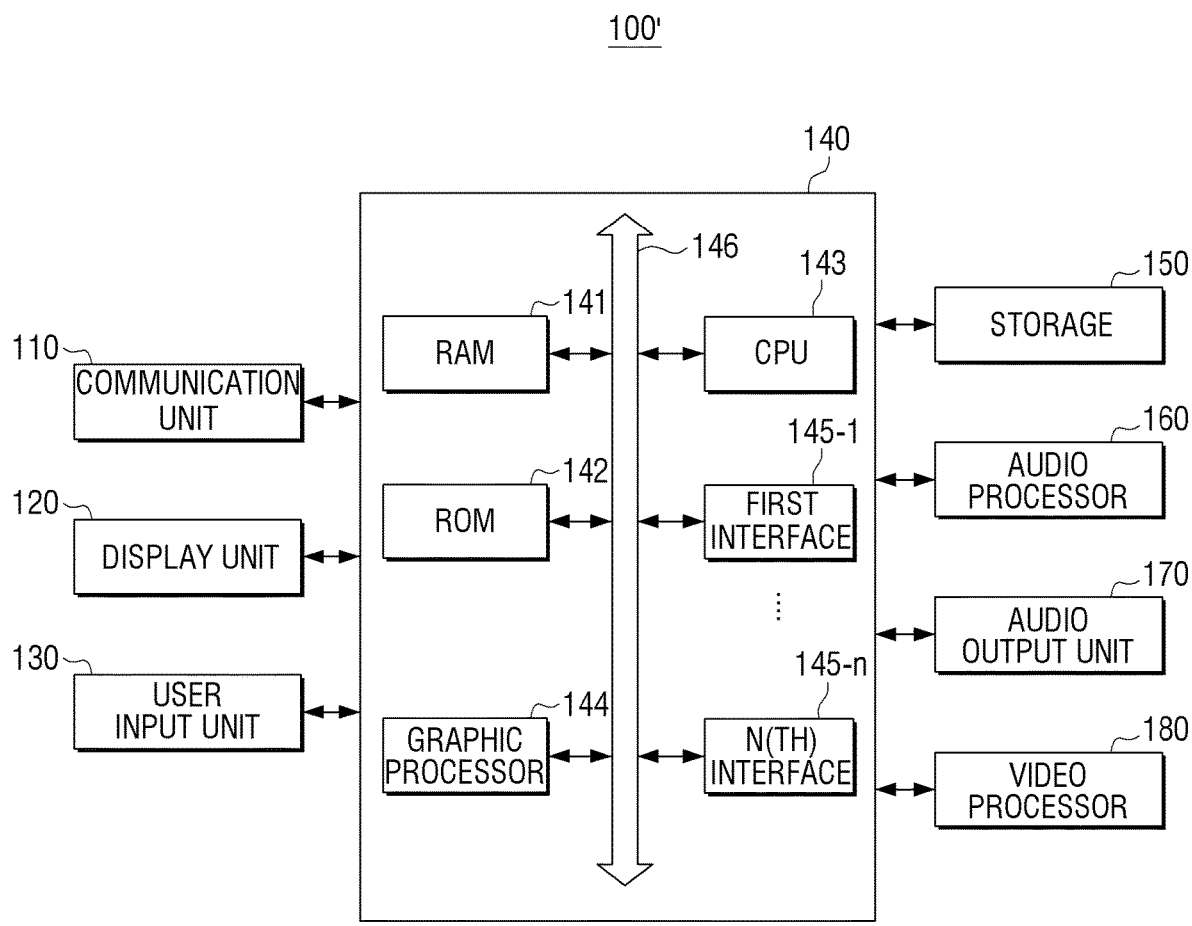
FIG. 10 is a block diagram illustrating a detailed structure of a user terminal device according to another embodiment disclosed herein.

FIG. 10 is a block diagram illustrating a detailed structure of a user terminal device according to another embodiment disclosed herein.

As illustrated in FIG. 10, a user terminal device 100' according to another embodiment disclosed herein includes a communication unit 110, a display unit 120, a user input unit 130, a processor 140, a storage 150, an audio processor 160, an audio output unit 170, and a video processor 180. Some of the components are the same as described above in FIG. 1, and a repeated description is omitted.

The processor 140 may include a Random Access Memory (RAM) 141, a Read-Only Memory (ROM) 142, a Central Processing Unit (CPU) 143, a graphic processor 144, first to n(th) interfaces 145-1 to 145-n, and a bus 146. The RAM 141, the ROM 142, the CPU 143, the graphic processor 144, and the first to n(th) interfaces 145-1 to 145-n may be interconnected through the bus 146.

The ROM 142 may store a command set for system booting. In response to power being supplied by a turn-on command, the CPU 143 may copy an Operating System (O/S) in the storage 150 to the RAM 141 according to the commands stored in the ROM 142 and boot up a system by executing the O/S. Upon completion of the booting operation, the CPU 143 may copy various application programs in the storage 150 to the RAM 141 and execute the application programs copied to the RAM 141 to perform various operations.

The CPU 143 may access the storage 150 and perform the boot-up operation by using the O/S in the storage 150. Further, the CPU 143 may perform various operations by using diverse programs, contents, and data stored in the storage 150.

The graphic processor 144 may generate a screen including various objects, such as, icons, images, or text, by using a computing unit (not shown) and a rendering unit (not shown). The computing unit may compute attribute values, such as, coordinate values, shapes, sizes, and colors of the objects, according to a layout of the screen. The rendering unit may generate a screen including the objects in various layouts based on the attribute values computed by the computing unit.

The first to n(th) interfaces 145-1 to 145-n may be connected to the aforementioned various components. One of the interfaces 145-1 to 145-n may be realized as a network interface connected to an external apparatus through a network.

The above-described operations of the processor 140 may be performed by the programs or applications stored in the storage 150.

The storage 150 may store various data, such as, an O/S software module for driving the user terminal device 100' or diverse multimedia contents. To be specific, the storage 150 may store a base module for processing signals transmitted from respective hardware of the user terminal device 100', a storage module for managing a database (DB) or registry, a graphic processing module for generating a layout screen, a security module, or the like.

Other than the above components, the user terminal device 100' may include the audio processor 160 for processing audio data, the audio output unit for outputting the processed audio data, and the video processor 180 for processing video data.

Figure 11:
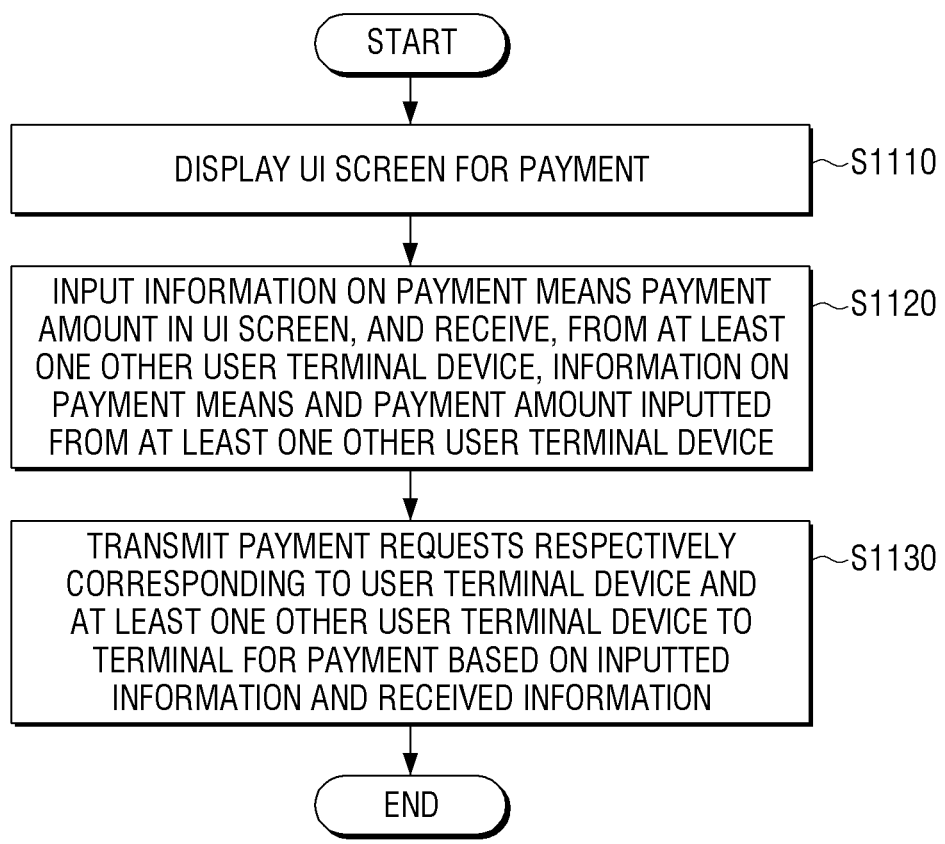
FIG. 11 is a flowchart provided to describe a method for processing payment using a user terminal device according to an embodiment disclosed herein.

FIG. 11 is a flowchart provided to describe a method for processing payment using a user terminal device according to an embodiment disclosed herein.

The user terminal device may display A UI screen for payment (S1110).

Subsequently, the user terminal device may input information on a payment means and a payment amount in the UI screen and receive information on a payment means and a payment amount inputted from at least one other user terminal device (S1120).

Subsequently, the user terminal device may transmit payment requests respectively corresponding to the user terminal device and the at least one other user terminal device to the terminal for payment based on the inputted information and the received information (S1130).

Figure 12:
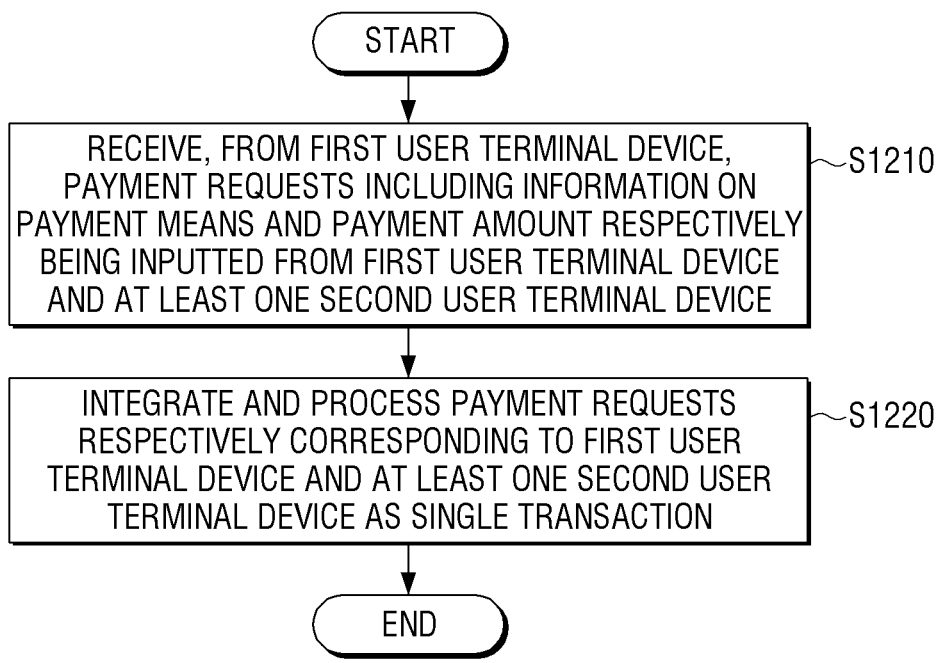
FIG. 12 is a flowchart provided to describe a method for processing payment using a terminal for payment according to an embodiment disclosed herein.

FIG. 12 is a flowchart provided to describe a method for processing payment using a terminal for payment according to an embodiment disclosed herein.

The terminal for payment may receive, from a first user terminal device, payment requests including information on a payment means and a payment amount respectively being inputted from the first user terminal device and at least one second user terminal device (S1210).

Subsequently, the terminal for payment may integrate and process the payment requests respectively corresponding to the first user terminal device and the at least one second user terminal device as single transaction (S1220).

According to the above-described various embodiments, the payment requests transmitted from a plurality of users may be processed in a lump sum according to a payment means and a payment amount selected by each user, and the payment may be performed quickly and conveniently. Further, the plurality of payment requests are processed as single transaction, which may reduce a fee from a payment terminal and the burden of a business operator.

The method for controlling a user terminal device according to the above-described various embodiments may be realized as a program and stored in various recording mediums. In other words, a computer program which may be processed by various kinds of processor and execute the above-described various payment methods may be stored and used in the recording mediums.

By way of example, a non-transitory computer readable medium may be provided with a program for executing the operations of displaying a UI screen for payment, inputting information on a payment means and a payment amount in the UI screen and receiving, from at least one other user terminal device, information on a payment means and a payment amount inputted from the at least one other user terminal device, and transmitting payment requests respectively corresponding to the user terminal device and the at least one other user terminal device to the terminal for payment based on the inputted information and the received information.

The non-transitory computer readable medium refers to a machine-readable medium that stores data semi-permanently unlike a register, a cache, or a memory that stores data for a short time. Particularly, the above-described various applications and programs may be stored in and provided through the non-transitory computer readable medium, such as, a Compact Disc (CD), a Digital Versatile Disc (DVD), a hard disc, a Blu-ray disc, a Universal Serial Bus (USB), a memory card, a Read-Only Memory (ROM), or the like.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to those skilled in the art.

What is claimed is:

1. A user terminal device comprising:
   a communication unit;
   a display; and
   a processor configured to:
   control the display to display a User Interface (UI) screen comprising a first area for inputting a payment method and a second area for inputting a payment amount;
   obtain information on a payment method of the user terminal device based on a user command input to the first area of the UI screen and a payment amount of the user terminal device based on a number input to the second area of the UI screen;
   based on the user terminal device being closer in distance to a payment terminal than at least one other user terminal device, control the communication unit to receive, from the at least one other user terminal device, information on a payment method of the at least one other user terminal device based on a user command input to a first area of a UI screen displayed on the at least one other user terminal device and a payment amount of the at least one other user terminal device based on a number input to a second area of the UI screen displayed on the at least one other user terminal device; and
   control the communication unit to transmit payment requests respectively corresponding to the user terminal device and the at least one other user terminal device to the payment terminal based on the obtained information and the received information,
   wherein the processor is further configured to:
   receive from the payment terminal, via the communication unit, recommendation information related to the payment method, and
   control the display to display the recommendation information and control the communication unit to transmit the recommendation information to the at least one other user terminal device,
   wherein the recommendation information corresponding to the user terminal device and the recommendation information corresponding to the at least one other user terminal device are different as a server to which the user terminal device is registered and a server to which the at least one other user terminal device is registered are different.

2. The user terminal device as claimed in claim 1, wherein the processor is configured to control receiving, from the payment terminal, via the communication unit, a total payment amount.

3. The user terminal device as claimed in claim 2, wherein the processor is configured to add up payment amounts based on the obtained information and the received information, and, based on the added payment amounts corresponding to the received total payment amount, control the communication unit to transmit the payment requests to the payment terminal.

4. The user terminal device as claimed in claim 1, wherein the processor is configured to control the communication unit to receive, from the payment terminal, notification information relating to completion of payment approval.

5. A payment method using a user terminal device, the method comprising:
   displaying a User Interface (UI) screen comprising a first area for inputting a payment method and a second area for inputting a payment amount;
   obtaining information on a payment method of the user terminal device based on a user command input to the first area of the UI screen and a payment amount of the user terminal device based on a user command for inputting a number input to the second area of the UI screen;
   based on the user terminal device being closer in distance to a payment terminal than at least one other user terminal device, receiving, from the at least one other user terminal device, information on a payment method of the at least one other user terminal device based on a user command input to a first area of a UI screen displayed on the at least one other user terminal device and a payment amount of the at least one other user terminal device based on a number input to a second area of the UI screen displayed on the at least one other user terminal device; and
   transmitting payment requests respectively corresponding to the user terminal device and the at least one other user terminal device to the payment terminal based on the obtained information and the received information,
   wherein the method further comprises:
   receiving from the payment terminal recommendation information related to the payment method, and displaying the recommendation information and transmitting the recommendation information to the at least one other user terminal device,
   wherein the recommendation information corresponding to the user terminal device and the recommendation information corresponding to the at least one other user terminal device are different as a server to which the user terminal device is registered and a server to which the at least one other user terminal device is registered are different.

6. The method as claimed in claim 5, further comprising: receiving, from the payment terminal, a total payment amount.

7. The method as claimed in claim 6, further comprising adding up payment amounts based on the obtained information and the information received from the at least one other user terminal device, and transmitting the payment requests to the terminal for payment based on the added payment amounts corresponding to the received total payment amount.

8. The method as claimed in claim 5, further comprising: receiving, from the payment terminal, notification information relating to completion of payment approval.

9. A payment terminal comprising:
   a communication unit;
   a distance measurement sensor; and
   a processor configured to:
   control receiving, from a first user terminal device, respective payment requests for each of the first user terminal device and at least one second user terminal device, each payment request including information on a payment methods of the first user terminal device and the at least one second user terminal device and payment amounts of the first user terminal device and the at least one second user terminal device;

integrate the respective payment requests as a single transaction, wherein the information on payment amount of the first user terminal device is based on a number input to a UI screen displayed on the first user terminal device, and wherein the information on payment amount of the at least one second user terminal device is based on a number input to a UI screen displayed on the at least one second user terminal device, wherein the processor is further configured to transmit, via the communication unit, recommendation information related to the payment method to the first user terminal device, wherein the processor is configured to, based on sensor data from the distance measurement sensor, determine a distance between the payment terminal and a plurality of user terminal devices and control the communication unit to transmit a control signal for enabling a user terminal device which is closest to the payment terminal to operate as the first user terminal device, and wherein the recommendation information corresponding to the first user terminal device and the recommendation information corresponding to the at least one second user terminal device are different as a server to which the first user terminal device is registered and a server to which the at least one second other user terminal device is registered are different.

10. The payment terminal for payment as claimed in claim 9, wherein the processor is configured to control the communication unit to transmit payment approval requests on payment amounts of the first user terminal device and the at least one second user terminal device to external servers respectively corresponding to the payment methods of the first user terminal device and the at least one second user terminal device.

11. The payment terminal as claimed in claim 9, wherein the processor is configured to control the communication unit to transmit a total payment amount to the first user terminal device.

12. The device as claimed in claim 1, wherein the processor is configured to integrate the payment requests respectively corresponding to the user terminal device and the at least one other user terminal device and control the communication unit to transmit the integrated payment requests to the payment terminal.

* * * * *